United States Patent [19]
Stahara et al.

[11] Patent Number: 5,273,246
[45] Date of Patent: Dec. 28, 1993

[54] HANGER BRACKET FOR DISTRIBUTION TRANSFORMER

[75] Inventors: Ronald J. Stahara; Bernard M. Hughes, both of Lexington, Ky.

[73] Assignee: Kuhlman Corporation, Versailles, Ky.

[21] Appl. No.: 946,287

[22] Filed: Sep. 17, 1992

[51] Int. Cl.$^5$ .............................................. F16L 3/00
[52] U.S. Cl. ................................ 248/218.4; 248/300; 248/225.1
[58] Field of Search ............... 248/225.1, 218.4, 224.1, 248/224.3, 690, 674, 692, 683, 230, 311.2, 300, 603; 336/65, 67, 68

[56] References Cited

U.S. PATENT DOCUMENTS

| | | | |
|---|---|---|---|
| 231,440 | 8/1880 | Miller | 248/674 |
| 1,435,763 | 11/1922 | Townsend | 248/603 X |
| 1,673,886 | 6/1928 | Sattels | 336/67 X |
| 2,731,228 | 1/1956 | Baldwin, Jr. et al. | 248/300 |
| 2,883,135 | 4/1959 | Smalley | 248/230 |
| 2,908,469 | 10/1959 | Mack et al. | 248/230 |
| 2,910,261 | 10/1959 | Ward et al. | 248/230 |
| 3,301,518 | 1/1967 | Yetter et al. | 248/311.2 |
| 3,462,645 | 8/1969 | Leonard | 336/67 X |
| 3,704,001 | 11/1972 | Sloop | 248/230 X |
| 3,750,992 | 8/1973 | Johnson | 248/230 X |

OTHER PUBLICATIONS

Prior Art Canadian Standard Bracket, CAN/CSA-C-2-1991 (Oct. 1991).

*Primary Examiner*—Karen J. Chotkowski
*Attorney, Agent, or Firm*—Townsend and Townsend Khourie and Crew

[57] ABSTRACT

A bracket for the mounting of distribution transformer tanks to the tops of supports, such as utility poles is disclosed. The bracket is formed from a single stamped band of metal and includes a narrow vertically disposed front bracket surface just sufficiently wide to accommodate a conventional jump proof lip for attachment to a bracket or bolt holding the bracket to the support—such as a pole. Paired vertically disposed bracket sides diverge from the front surface to and toward the supported tank. These sides are bent at welding pad support legs. These legs are in parallel alignment, and extend until the tank sides. At the tank sides, the bracket at each side flares outwardly and ends to define a welding pad with discrete major surface areas tangent to the tank sides. When weld material is placed continuously around these firm tank attachment of the bracket occurs.

4 Claims, 3 Drawing Sheets

HANGER BRACKET FOR DISTRIBUTION TRANSFORMER

This invention relates to distribution transformers commonly found at the top of utility poles. More particularly, an improved hanger bracket is disclosed for placement between pole mounted bolts or supporting brackets and the transformer supporting tank for suspending such distribution transformers from any kind of support, such as the top of utility poles.

BACKGROUND OF THE INVENTION

Distribution transformers are conveniently suspended from the tops of supports, such as utility poles or other isolated locations. In these positions, they are elevated away from intermeddling and are immediately adjacent the primary and secondary electrical circuits that they serve. Consequently, such transformers, once installed, remain in place for many years. Thus, it is of particular importance that the original transformer manufacture be of integrity and that these relatively large, heavy objects—in the range of up to 4,000 pounds—be both easy to install and remain installed during the entire service life of up to 30 or 40 years.

Such distribution transformers are contained within a tank, which tank can either be round or square. These transformers can vary; they can include conventional single phase or three phase transformers. Consequently, the tank is in turn provided with a regulation mandated nameplate and brackets. The function of the nameplate is to identify the transformer. This information must be easily available to elevated line personnel effecting connection, and routing of power from the transformer. Since changes in connections and routing of power occur during the relatively long service life of the transformer, the nameplate information display must last as long as the service life of the transformer.

Installation of nameplates to such distribution transformers constitutes a difficulty. Nameplates are now commonly affixed directly to the tank sides. Mounting brackets have not been utilized for the placement of the nameplates. Due to the configuration of the sides of prior art brackets utilized to affix distribution transformer tanks to these supports, the dimension of the side of the bracket is insufficient to accommodate the dimension of the regulation mandated nameplate.

Affixing the nameplate data to the tank sides is not as simple as it sounds. Specifically, it is required that the nameplate remain affixed to the tank sides during the full in-service life of the transformer. It is further required that the nameplate not interfere with the integrity of the tank. For example, it cannot be a point of attachment where the paint surface of the tank is interrupted. This being the case, there is a surprising elaboration of detail devoted to the simple task of adhering the nameplate to the tank.

In one commonly used solution, a separate and discrete nameplate bracket is first attached to the tank. This discrete tank mounted nameplate bracket is paint protected. Thereafter, the nameplate is attached to the bracket. Thereafter, the nameplate is bent to gain access and paint protection applied to the bracket and nameplate to insure both permanence of the nameplate and corrosion protection of the tank during the full in service life of the distributing transformer.

Having set forth the problem with nameplates, attention can now be turned to those problems directly associated with the mounting brackets themselves.

These mounting brackets constitute the support points to the supporting transformer tank as well as the connection to the support, such as a utility pole. These brackets must be securely welded to the tank. The brackets must have static and dynamic properties to maintain the supported transformers to the supports under the worst possible conditions that can occur in their long in service life. For example, one standard requires that the brackets be able to withstand five times the weight of the distribution transformer without tearing of the metal of the brackets.

Required testing of such brackets is not trivial. Brackets are tested to destruction. Further, one bracket is assumed to support the entire load. This being the case, this one bracket is required to withstand the five times weight requirement of the required support. Further, although the brackets are permitted to deform during such tests, tearing of the metal of the brackets is not permitted.

These brackets must be painted—inside and out—to accommodate the longest possible service life of the transformer against possible corrosion. Finally, the brackets must make the installation and removal of the transformers as facile as possible. Bearing in mind that line personnel are usually at the top of a utility pole, hanging out on a climbing belt, manual tasks such a fixing the bracket to the pole must be facilitated by the design of the bracket.

Present brackets have remained unchanged for many years. All known brackets include a truncated rectilinear frame member having two parallel sides. In one embodiment—see FIGS. 2A and 2B—a bracket piece is separately and discretely welded onto a linear piece connecting the two parallel sides to form the bracket bolt anchorage to the utility pole. In another embodiment, the linear member connecting the two side is bent along four substantially 90° fold lines to form the bracket bolt anchorage to the utility pole.

It will be understood that distribution transformers are each hung by two such brackets from the tank sides. Typically, one bracket is a top bracket and the other bracket is a bottom bracket placed directly under the top bracket. Usually, the top bracket has a "jump proof lip" for hanging onto the bolt or bracket to which the transformer is mounted. The lower bracket is usually conventional and does not include the jump proof lip. Thus, where there is a dynamic loading on the transformer mount, the jump proof lip prevents the transformer from moving upwardly and free of its attachment to the pole mounted bolt or bracket.

Both bracket types have similar deficiencies.

First, and with regard to both brackets, attachment to the tank occurs by a butt weld. Specifically, the end piece of metal of the bracket abuts the rounded surface of the tank. Typically, each side of the bracket is tack welded in place and the butt weld completed by welding around the plane of abutment with discrete top, outside, bottom and remaining inside the bracket welding passes. The bracket itself often obstructs and renders inconvenient these welding passes, especially the inside welding passes. While such attachment is secure, it is only as strong as the butt point of abutment of the bracket.

Secondly, and once the brackets are attached, corrosion protective paint must be applied. Again, the configuration of the bracket obstructs access—primarily on the inside—for proper painted protection against the possible years of weathering corrosion during in-service life.

Assuming that the brackets are properly installed, the transformer is then hoisted for installation at the top of a utility pole. In such installation, access to the interior of the attached hanger brackets is required by the line personnel, typically hanging out at the ends of their working belts directing the lowering of the transformers and simultaneously attaching the brackets to the poles. In such attachment, turning of attaching bolts is required from the inside of the brackets. Unfortunately, the brackets of the prior art at their access restricting sides only serve to restrict such attachment. Sufficient space is not provided to allow the wrenches to "see" the bolts for secure attachment. Rotation of bolts interior of the brackets is restricted to small, discrete, repetitive increments of rotation consuming both the time and effort of the elevated line personnel.

After compiling the foregoing information, a new distribution transformer tank bracket has been developed. This design happens to address all of the above recited shortcomings.

SUMMARY OF THE INVENTION

A bracket for the mounting of distribution transformer tanks to the tops of supports, such as utility poles is disclosed. In the following description, dimensions of one typical bracket will be used. The reader will understand that these dimensions are exemplary; the requirements of larger or small brackets may cause the dimensions to vary.

The bracket is formed from a single stamped band of rectilinear metal about 16 inches in length, 5.6 inches high and 0.25 inches in thickness. In the middle of this rectilinear strip, the pole or bracket mounting portion includes a narrow vertically disposed front bracket surface just sufficiently wide (about 1.9 inches) to accommodate a conventional mounting lip for lowering attachment to a bracket or bolt holding the bracket to the support—such as a utility pole. The front mounting lip includes a defined downward open top rounded slot for resting against a supporting bolt, a bottom gathering surface for assistance in finding the bolt during lowering, and in the case of at least one of the brackets lower conventional jump proof lips.

Paired vertically disposed bracket sides diverge from the front surface to and toward the supported tank for a distance of about 3.75 inches, at angles of about 60°. These diverging sides end at welding pad support legs. These welding pad supporting legs are bent from the diverging sides in parallel alignment, and extend about 1.5 inches to the tank sides. At the tank sides, the bracket at each side flares outwardly at an angle of about 110° and ends to define a welding pad with discrete major surface areas about 0.75 inches wide tangent to the tank sides. When weld material is placed continuously around these welding pads, firm tank attachment of the bracket occurs.

Review of the bracket against the known disadvantages of the prior art is instructive.

First, the flared bracket sides extending from the bracket front to the tank have sufficient dimension to allow simple nameplate attachment. Specifically, a 3.25 inch by 5 inch surface for nameplate mounting is defined. Further, mounting of the nameplate can simply occur by drilling through the bracket with simple through holes.

Secondly, the sides of the bracket are disposed at an angle where the nameplate information can be conveniently accessed and read by elevated line personnel. Thus, no longer are elaborate nameplate attachment precautions required to the tank itself.

Thirdly, the welding pads at the ends of the bracket sides constitute convenient welding attachment points to the tank sides. Specifically, such pads are welded with discrete weld metal passes along their top, outside bracket surface, bottom and inside bracket surface. Paired points of bracket attachment are defined around the 0.75 inch wide, 5.6 inch high welding pads, with these pads tangent to the tank sides.

Further, the combination of the flared diverging sides together with the short parallel extensions leading to the paired welding pads enables access for welding. This is particularly important to the inside of the bracket welding pass. Finally, the welding pads are disposed at their major surface parallel to the surface of the tank. No longer must reliance be based on a single butt weld.

Fourth, the essential step of required painting is assisted. Just as the weld is easier to install, the paint is likewise easier to place.

Finally, the combination of the narrow front and diverging bracket sides opens the interior of the bracket to access when the distribution transformer is being installed in its elevated disposition by working line personnel. Specifically, the combination of the diverging sides and narrow front together with the produced "stand off" of the narrow front mounting enable access. It is much easier to manipulate fastening bolts and bracket parts in the enlarged confines of the improved bracket.

BRIEF DESCRIPTION OF THE DRAWINGS

Further objects, features and advantages of the invention may be understood after reference to the following specification and attached drawings in which.

DESCRIPTION OF THE PREFERRED EMBODIMENT

Figure 2A:
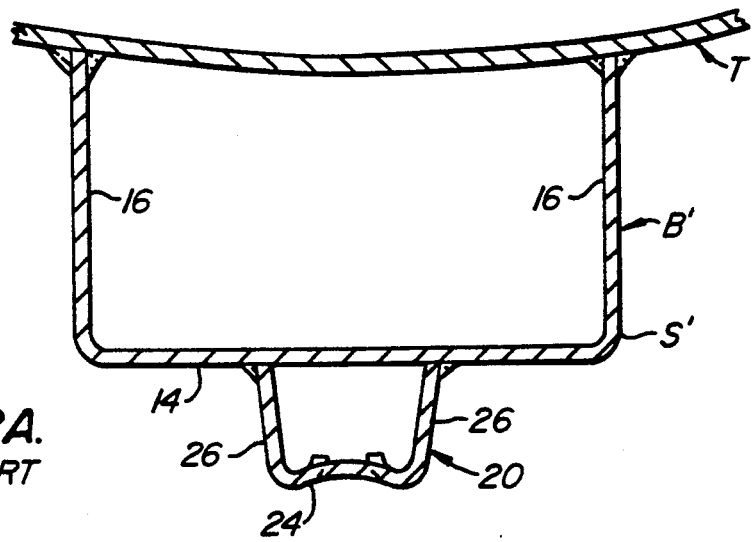
FIG. 2A and 2B are top plan and front elevations of a prior art bracket.
Figure 2B:
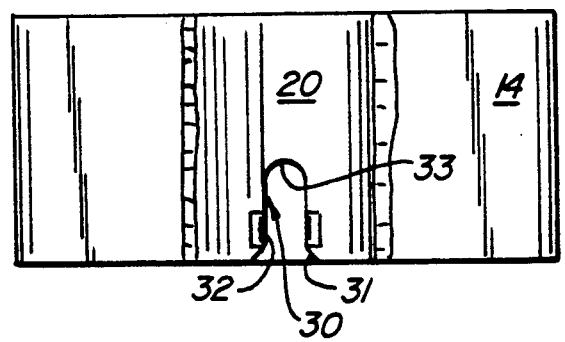

Referring to FIGS. 2A and 2B, the bracket of the prior art can be understood. Specifically, rectilinear metallic strip S' is bent in an "U" shaped configuration. This surface includes a front surface 14, and two parallel side surfaces 16 bent at right angles to front surface 14. As is shown in FIG. 2A, butt welding at the ends of the "U" occurs to the tank sides.

A comment may be offered about the described butt weld. Although passes of weld metal will be made outside, inside, top and bottom, essentially there is a single linear connection on each side of the bracket B' to the tank. Thus, it will be understood over the pad hereafter disclosed, that the welded connection of the prior art does not include the inherent strength of the welded connection.

In the bracket shown in FIGS. 2A and 2B, a second essential "U" shaped bracket is welded onto front piece 14. This second "U" shaped bracket 20 includes front piece 24 and side pieces 26. Front piece defines a conventional bolt receiving slot 30 with lower gathering surfaces 31, upper rounded surface 33, and so-called jump proof lip 32—comprising inwardly bent metal tabs. These inwardly bent metal tabs 32 interfere with either a bolt or portion of a bracket should dynamic loading on the distribution transformer cause the transformer to lift during its in service life.

Regarding welding and painting of the bracket, one look will convince the reader that this will be other than convenient. Further, it can be seen that second "U" shaped member 20 is a severely restricted environment for the likes of tightening any bolt for the secure attachment of the distribution transformer.

In a well known prior art departure from the particular bracket B' shown in FIGS. 2A and 2B, brackets are sometimes made without separate "U" shaped member 20 but instead by providing a single rectilinear piece of metal with six separate folds. The end result of this construction is to open the back surface. However, since most bolts are tightened against forward surface 24, this opening is of little beneficial effect, especially when it is remembered that the bolt is usually manipulated against the back metal surface of front 24.

Having set forth the prior art, the invention of the present invention can be described.

Referring to the perspective view of FIGS. 1, 4A, 4B and 4C, the bracket B of this disclosure can be fully understood.

Figure 3:
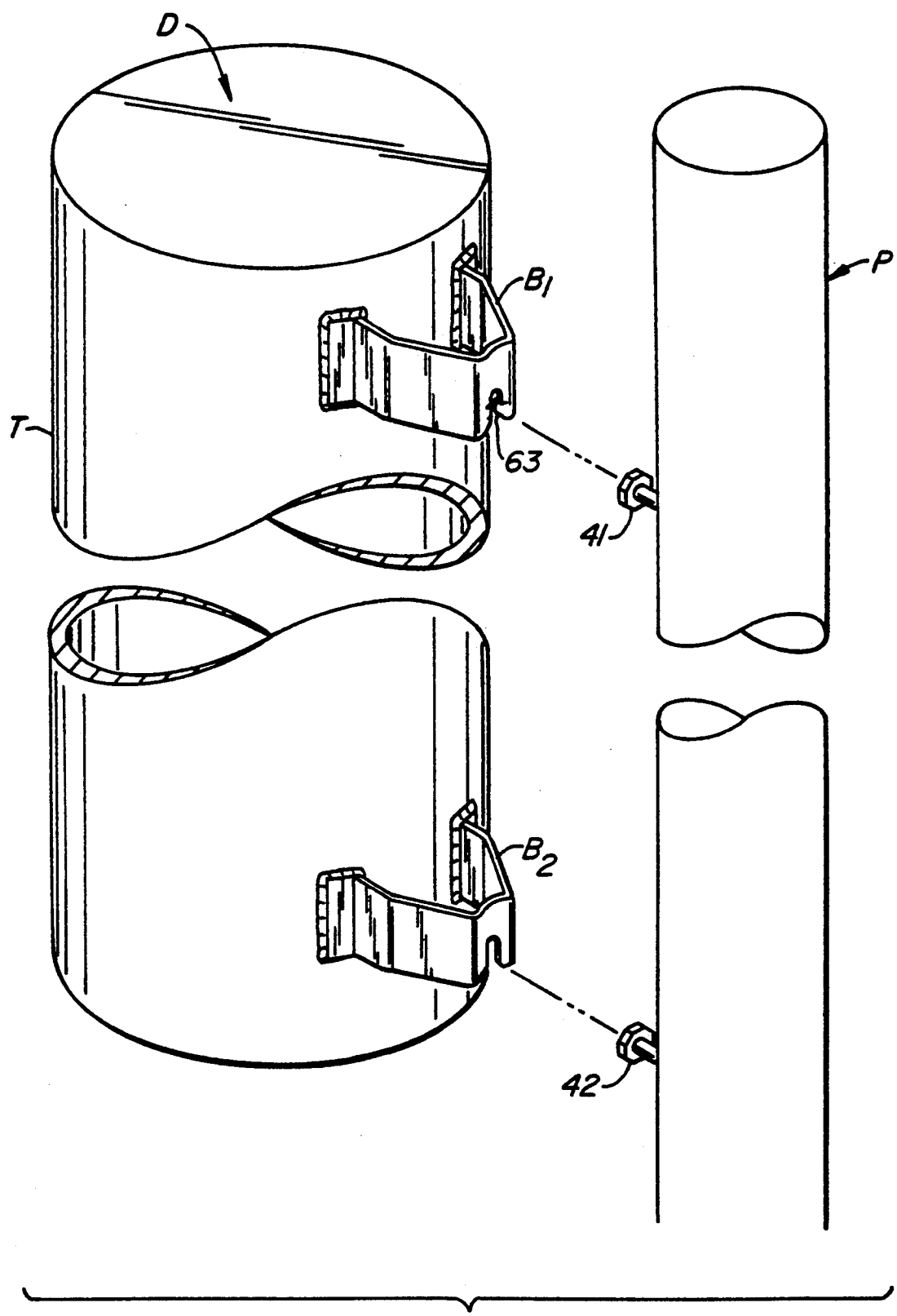
FIG. 3 is a reduced scale perspective of a distribution transformer at the top of a utility pole supported by paired upper and lower brackets.
Figure 4A:
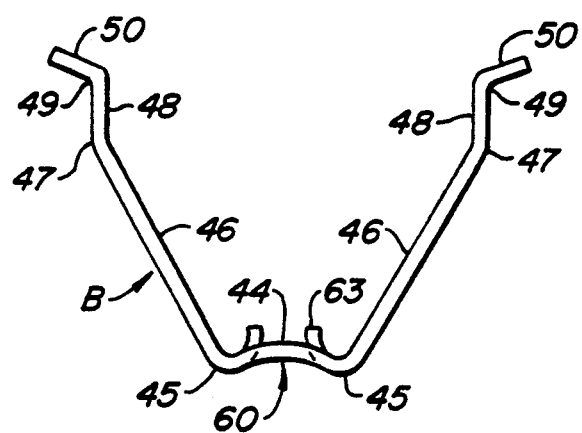
FIGS. 4A, 4B and 4C are respective top plan, side elevation and front elevations of the bracket.
Figure 4B:
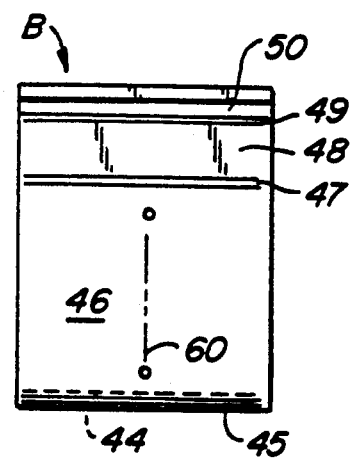
Figure 4C:
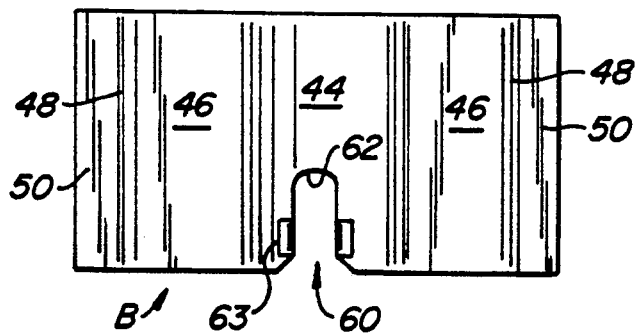

Front surface 44 is disclosed between two folds 45 having sufficient width to accommodate bolt or bracket member receiving slot 60 with upper rounded surface 62 and jump proof tabs 63. As can be seen in the perspective view of FIG. 3, tabs 63 are usually included with upper bracket B1, and omitted with lower bracket B2 to support tank T of a distribution transformer D to a utility pole P.

Diverging sides 46 usually diverge at respective 30° angles with respect to front surface 44 or 60° with respect to one another. These sides end folds 47, transcending the end of diverging sides 46 define the beginning of welding pad support legs 48. Welding pad support legs 48 begin at folds 47 and end at folds 49. At folds 49 connection to welding pad 50 occurs.

Figure 1:
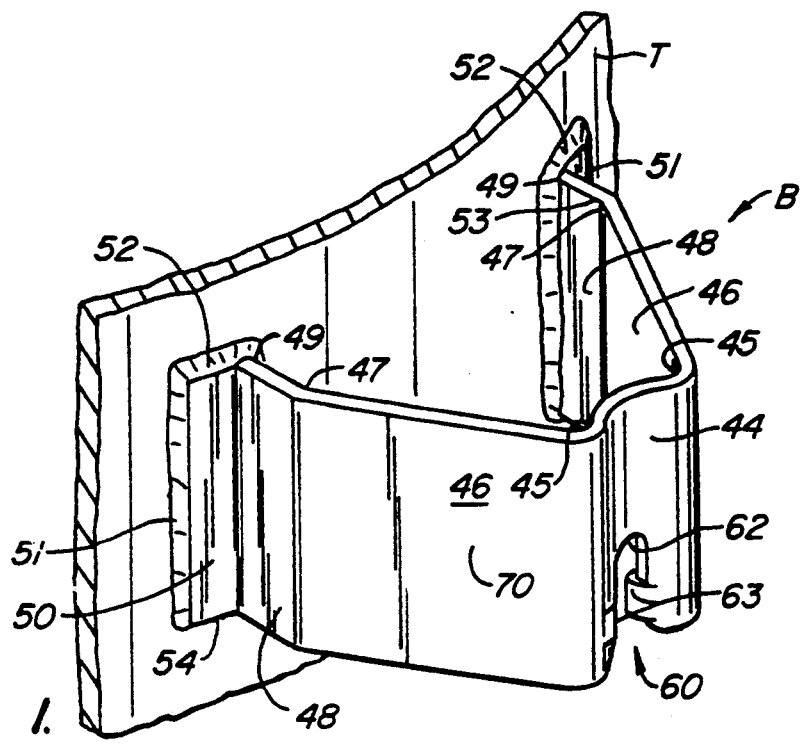
FIG. 1 is a perspective partial view of a distribution transformer attached at the mounting bracket of this invention.

Returning to the perspective of FIG. 1, it will be understood that each welding pad 50 is preferably connected by four discrete welding metal passes to tank T. These passes include outside pass 51, top pass 52, inside pass 53, and bottom pass 54.

It will be seen, utilizing the preferred dimensions already given, that the rectilinear strip from which fabrication occurs is in the order of 16 inches long and 5.6 inches high. Further, and considering that the rectilinear strip includes a major axis 70—see FIGS. 1 and 4C, all folds are at right angles to this axis.

Dependent upon the relative size of the distribution transformer to be mounted, other dimensions—approximately in the same relative proportions can be utilized. Further, while it is possible to bend welding pads 50 inwardly of bracket B, we prefer the outwardly flared construction at 110° here illustrated.

What is claimed is:

1. In combination:
    a tank for supporting said distribution transformer;
    upper and lower brackets for the mounting said transformer tank to the tops of supports, such as utility poles;
    each said bracket formed from a single rectilinear band of metal, said band rectilinear about a major axis and having multiple folds normal to said major axis;
    said folds defining:
    a narrow vertically disposed front bracket surface between two central folds, said surface sufficiently wide to accommodate a conventional lip for attachment to a bracket or bolt;
    paired vertically disposed diverging bracket sides diverging from said front surface apart from one another to and toward said transformer tank and each ending at a weld pad leg fold;
    paired welding pad supporting legs beginning at said weld pad leg fold at the ends of said bracket sides remote from said front, said welding pad supporting legs bent in parallel alignment from until a point of contact with the tank sides; and,
    paired welding pads defining a major discrete surface area, one pad each attached to said welding pad supporting legs at pad support folds with said discrete surface area tangent to the exterior surface of said tank for permitting firm tank attachment upon circumferential placement of weld material completely around said welding pad; and,
    welding passes around each said welding pad for fastening said welding pad to said tank.

2. The combination of claim 1 and further including:
    said diverging bracket sides diverge at and angle of about 30° with respect to said front bracket surface.

3. The combination of claim 1 and further including:
    a jump proof mounting at said front bracket surface of at least one said bracket.

4. The combination of claim 1 and further including:
    said welding pads diverging outwardly of said welding pad supporting legs at said distribution transformer tank surface.

* * * * *